US007014242B2

(12) United States Patent
Kim

(10) Patent No.: US 7,014,242 B2
(45) Date of Patent: Mar. 21, 2006

(54) CAR MATTRESS

(76) Inventor: Hyuk Jong Kim, 13-108, Garak Hanra Apt. 165, Garak-dong, Songpa-gu, Seoul 138-160 (KR)

( * ) Notice: Subject to any disclaimer, the term of this patent is extended or adjusted under 35 U.S.C. 154(b) by 71 days.

(21) Appl. No.: 10/495,304

(22) PCT Filed: Nov. 14, 2002

(86) PCT No.: PCT/KR02/02127

§ 371 (c)(1),
(2), (4) Date: May 12, 2004

(87) PCT Pub. No.: WO03/041994

PCT Pub. Date: May 22, 2003

(65) Prior Publication Data

US 2004/0251706 A1    Dec. 16, 2004

(30) Foreign Application Priority Data

Nov. 16, 2001 (KR) ............................ 2001-0035241

(51) Int. Cl.
*B60N 3/06* (2006.01)
(52) U.S. Cl. .................... 296/75; 296/37.8; 296/37.15; 224/275; 297/188.11
(58) Field of Classification Search ................. 296/75, 296/37.8, 37.14, 37.15; 224/275; 297/188.03, 297/188.11

See application file for complete search history.

(56) References Cited

U.S. PATENT DOCUMENTS

| 859,494 | A | * | 7/1907 | Hardesty ................ 297/188.03 |
| 2,202,857 | A | * | 6/1940 | Jacobs ......................... 296/75 |
| 4,892,347 | A | * | 1/1990 | Steinhilber ................... 296/75 |
| 5,967,602 | A | * | 10/1999 | Ptak et al. ............. 297/188.11 |
| 6,145,931 | A | * | 11/2000 | Subotic ................. 297/188.11 |
| 6,390,547 | B1 | * | 5/2002 | Spykerman ............ 297/188.11 |

FOREIGN PATENT DOCUMENTS

| JP | 03-074228 | 3/1991 |
| JP | 04-050035 | 2/1992 |
| JP | 05-278512 | 10/1993 |

* cited by examiner

*Primary Examiner*—Lori L Coletta
(74) *Attorney, Agent, or Firm*—Ladas & Parry LLP

(57) ABSTRACT

The present invention relates to the car mattress. The car mattress in the present invention has the effects to move and fix freely the drawer unit and footing devised on the upper side of the body and to remove the bad smells in the drawer unit.

6 Claims, 4 Drawing Sheets

CAR MATTRESS

BACKGROUND OF THE INVENTION

1. Field of the Invention

The invention relates generally to a car mattress which is contrived to make the rider to get on the car more comfortably taking off his shoes.

2. Description of the Prior Art

This invention is a car mattress which is contrived to make the rider to get on the car more comfortably taking off his shoes.

Firstly, the conventional usual car mattress (the notification of registered utility model, application No. KR 20-1999-0026526) can be described as follows.

In order to prevent the bottom of car from contaminated by a driver or the other riders, it has various appearance. It consists of the landing part which is made of textile materials on the upper side of it and the fixing part which is made of lava and synthetic resin. The above mentioned car mattress has the Velcro to connect with the landing part and the fixing part on the edge in where the two parts meet. And, the filtering net whose meshes are fine is tied up, which its size is smaller than that of the inside of Velcro. Because of this, it has the problem that there take place bad smells although he took off his shoes, so that the rider can not drive comfortably.

The characteristics of the utility model (application No. 20-2001-29073) which I had already applied to solve the problems of the conventional car mattress can be described as followings: it has the mattress (100) which has a drawer unit (20) which has several partitions (21) to keep shoes and a lid (22) to open and close the drawer unit at one side on the upper side of the above mentioned body (10), and a footing (30) that can be assembled and on which the rider can put his foots on the upper side of the body (10).

However the above mentioned conventional invention has the drawer unit and the footing on the upper side of the body together. In this way, there are some inconveniences as followings: the a side of the above mentioned footing is caught with the drawer unit, when the rider have to move the above mentioned drawer unit to put the shoes in the above mentioned drawer unit; the drawer unit and the footing are disentangled by vibration or impact in the car; bad smells take place due to the shoes that is kept in the above mentioned drawer unit.

SUMMARY OF THE INVENTION

The present invention is a car mattress which is contrived to make the rider to get on the car more comfortably taking off his shoes.

The conventional car mattress consists of as followings: 1) a body that has the width corresponding to the bottom of car, 2) a drawer unit which has several partitions to keep shoes and a lid to open and close the drawer unit at one side on the upper side of the above mentioned body, 3) a footing that can be assembled. This invention has the characteristics in structure as followings: 1) the walls that support the footing and the drawer unit at the both side of the above mentioned body, 2) the fixing part that supports and settles the above mentioned footing on the upper side of the body, 3) the fixed counterpart which is movable beneath the footing which is corresponding to the above fixing part, 4) the groove to move the above mentioned drawer unit freely to the upper side of the settled footing inside the wall of the body., 5) the projection which is corresponding to the above mentioned groove at the both side of the above mentioned drawer unit.

Therefore, the car mattress in this invention has the effect to be able to move and fix freely the drawer unit and the footing on the upper side of the body, to remove the bad smell in the drawer unit by fixing the drawer unit and the footing.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1:
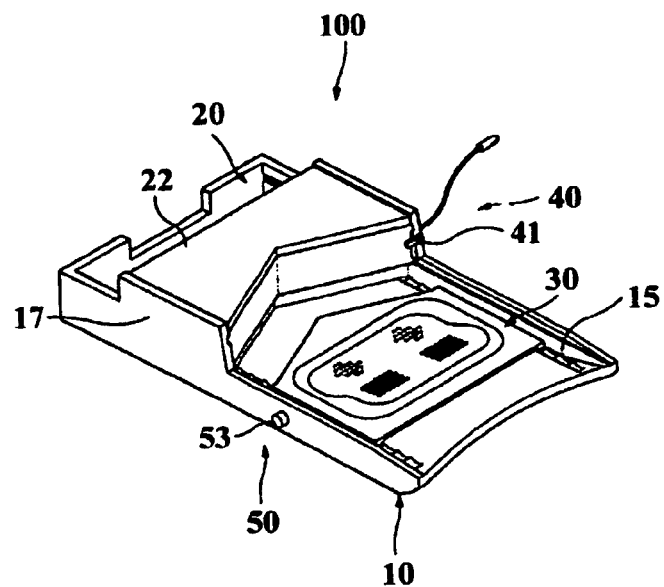
FIG. 1 is the perspective view of the car mattress according to the present invention.

The present invention will be described in detail by way of a preferred embodiment with reference to accompanying drawings.

The invention is a car mattress which is contrived to make the rider to get on the car more comfortably taking off his shoes.

Firstly, the conventional usual car mattress (the notification of registered utility model, application No. KR 20-1999-0026526) can be described as follows.

In order to prevent the bottom of car from contaminated by a driver or the other riders, it has various appearance. It consists of the landing part which is made of textile materials on the upper side of it and the fixing part which is made of lava and synthetic resin. The above mentioned car mattress has the Velcro to connect with the landing part and the fixing part on the edge in where the two parts meet. And, the filtering net whose meshes are fine is tied up, which its size is smaller than that of the inside of Velcro. Because of this, it has the problem that there take place bad smells although he took off his shoes, so that the rider can not drive comfortably.

The characteristics of the utility model (application No. 20-2001-29073) which I had already applied to solve the problems of the conventional car mattress can be described as followings: it has the mattress (100) which has a drawer unit (20) which has several partitions (21) to keep shoes and a lid (22) to open and close the drawer unit at one side on the upper side of the above mentioned body (10), and a footing (30) that can be assembled and on which the rider can put his foots on the upper side of the body (10).

However the above mentioned conventional invention has the drawer unit and the footing on the upper side of the body together. In this way, there are some inconveniences as followings: the a side of the above mentioned footing is caught with the drawer unit, when the rider have to move the above mentioned drawer unit to put the shoes in the above mentioned drawer unit; the drawer unit and the footing are disentangled by vibration or impact in the car; bad smells take place due to the shoes that is kept in the above mentioned drawer unit.

The technical tasks that the present invention seeks;

Therefore, the objective of the present invention is to ensure the free moving and fixing of the drawer unit which are devised on the upper side of the body, and to remove the bad smells from the drawer unit by fixing the above drawer unit and footing.

Figure 2:
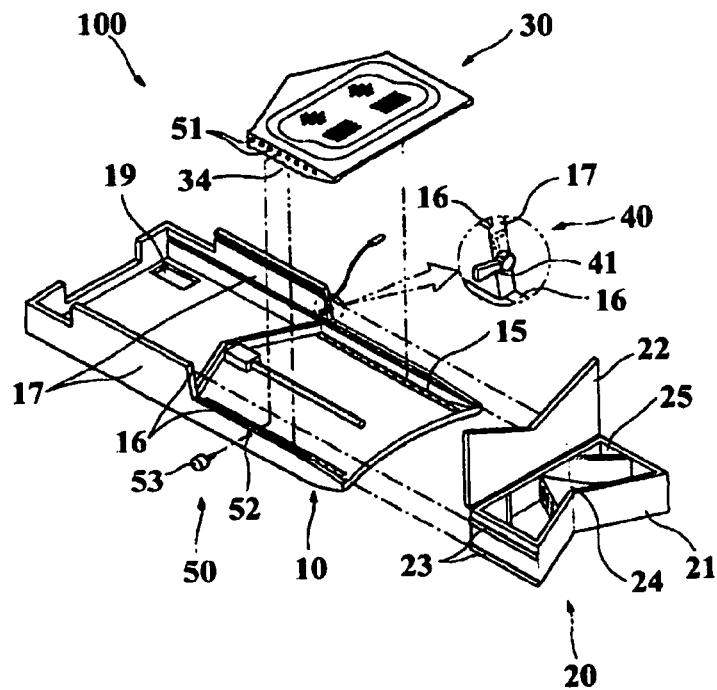
FIG. 2 is the exploded perspective view of the car mattress according to the present invention.
Figure 3:
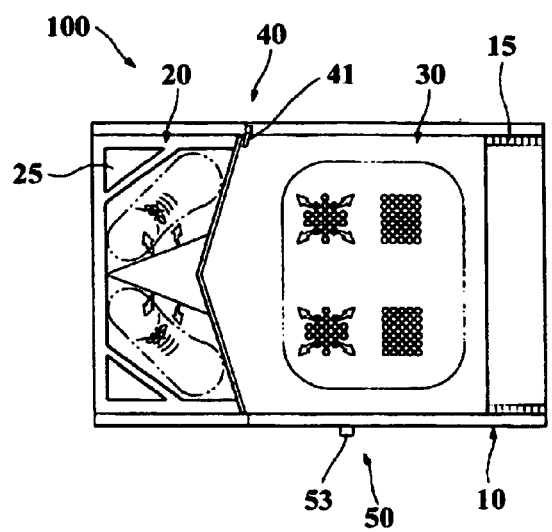
FIG. 3 is the plane figure of cross section of the selected important parts.
Figure 4:
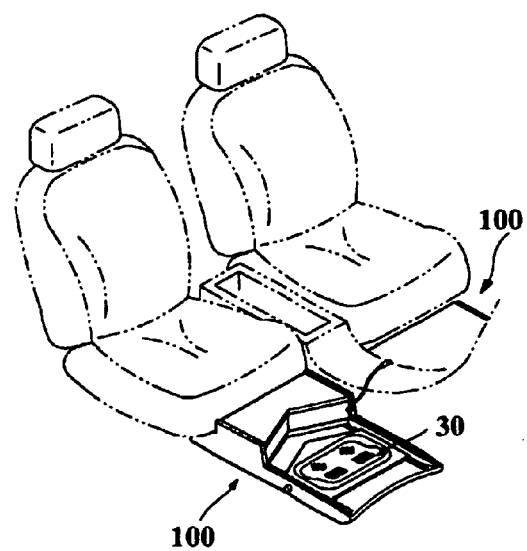
FIG. 4 shows the feature of car mattress which is in use.
Figure 5:
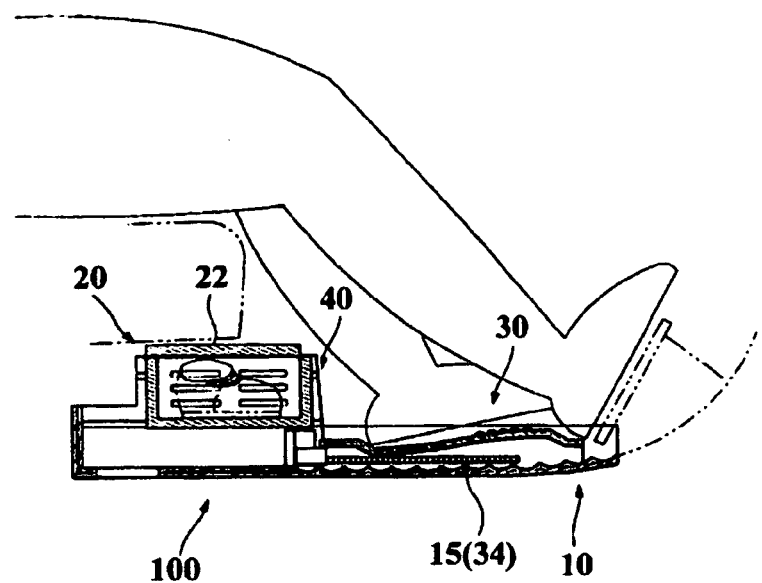
FIGS. 5 and 6 are the plane figures of cross section of the selected important parts, which shows the feature of car mattress which is in use according to the present invention.
Figure 6:
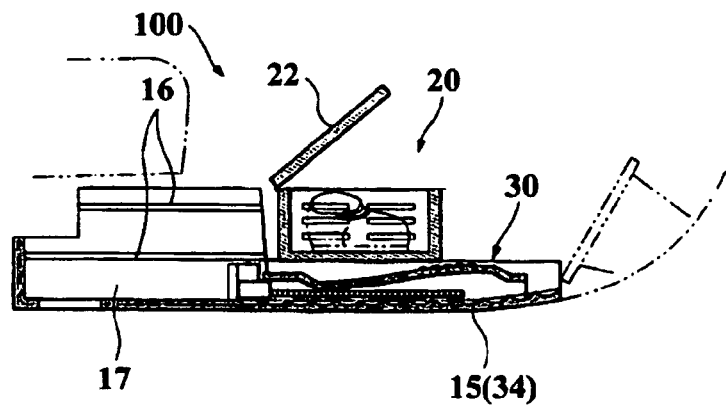

The structure and function of the present invention;

In accordance with the desired execution example of the present invention, the car mattress can be described by 'FIG. 1' and 'FIG. 2' as followings. The conventional mattress has the following structural features; 1) a body (10) that has the width corresponding to the bottom of car, 2) a drawer unit (20) which has several partitions (21) to keep shoes and a lid (22) to open and close the drawer unit at one side on the upper side of the above mentioned body (10), 3) a footing (30) that can be assembled, 4) the mattress (100) in which those all mentioned in the above are included.

However, This invention has the characteristics in structure as followings: the walls (17) that supports the footing (30) and the drawer unit (20) at the both side of the above mentioned body (10); the fixing part (15) that supports and settles the above mentioned footing (30) on the upper side of the body (10); the fixed counterpart (34) which is movable beneath the footing (30) which is corresponding to the above fixing part; the groove (16) to move the above mentioned drawer unit (20) freely to the upper side of the settled footing (30) inside the wall (17) of the body (10); the projection (23) which is corresponding to the above mentioned groove (16) at the both side of the above mentioned drawer unit (20).

The above mentioned drawer unit (20) and the footing (30) have the structure that can keep their fixed states in spite of the vibrations and impacts that are added in the car. This structure is described as followings: the fixing instrument of footing (50) and the fixing instrument of drawer unit (40) was added at the above mentioned footing (30) and drawer unit (2), that can fix and support them at the draw unit (20) and the body (10); the above mentioned fixing instrument of footing (50) includes the fixing hole which is drilled at a regular distance on a side of the footing (30), the fixing pin (53) which penetrates the fixing hole (52) and the penetrating hole (52) so that fixed the footing (30), and the penetrating hole (52) that is drilled to correspond to the one of the fixing holes (51) on a inside surface of the body (10); at the above mentioned the instrument to fix the drawer part (40), the fixing lever is added so that can fix and support a side of the drawer unit (20) by its rotation; the instruments to fix the footing (50) and the instruments to fix the drawer unit (40) can be made as various forms in the range of the present invention's idea, like as various physical switches and break structures; a structure is added to remove bad smells in the drawer unit (20), which includes the auxiliary drawer unit (25) that divides the space of drawer unit into several zone and is able to arrange goods, and the perfuming and disinfecting part (24) which is operated by the source of electricity of the car to remove the bad smells of shoes which are kept in the drawer unit; a operating hole (19) is added at the bottom surface of the body (10), which is drilled on a side of driver's seat so that the trunk lever and the petrol cap lever.

Figure 7:
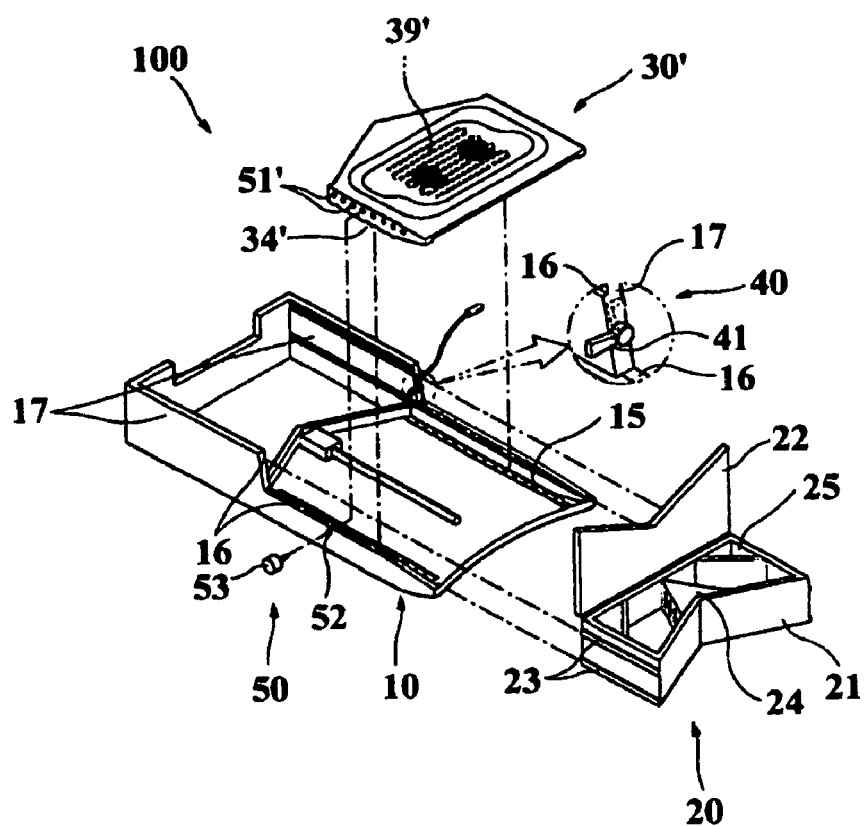
FIG. 7 is the exploded perspective view of the car mattress according to another embodiment of the invention.

With the other execution example by FIG. 7, the present invention is described as followings; a structure to move up the temperature of foot in the winter with taken off shoes is added the upper inside of the footing (30). This structure's characteristic is that it has the hot wire (39) to generate heat to the user's foot with taken off shoes in the upper inside of the footing (30'), which the hot wire is operated by the permission from the source of electricity of the car. Although the lid (22) of drawer unit (20) is not shown in this figure, its opening structure can be opened forwards or by a sliding structure in the technical idea of the present invention.

The using method and operating process of the present invention is described by FIGS. 3, 4, 5, and 6, as followings: the footing (30) is fixed on the upper side of the body (10). At this time, the fixed counterpart (34) of the footing (30) and the fixed part (15) of the body (10) supports each other and are fixed by the instrument to fix the footing (50); the instrument to fix the footing (50) can be fixed by the fixing pin (53) at the various positions that one of the fixing holes of the footing (30), which is placed at the penetrating hole (52) of the body (10) according to the length of user's lower part, corresponds to; the drawer unit (20) is supported and moved by fixing the projection (23) of the drawer unit (20) into the groove (16) of the body (10); the user can open easily the lid of the drawer unit (20) by the fixing lever (41) which is the instrument to fix the drawer unit, moving the drawer unit (20) to the one upper side of the body (10); the auxiliary drawer unit (25), which is devised inside of the drawer unit (20), can bear the various goods, and its inside is kept always clean by the perfuming and disinfecting part (24) which gets the source of electricity and connected with the cigar jack of the car; the hot wire (39') of the footing (30') in the other execution example keeps the temperature of the users' foots by getting the permission of the source of electricity.

The functions of the present invention is described as following: the footing (30) is fixed on the upper side of the body (10) so that supports the user's foots; the drawer unit (20), which is fixed at the body (10) and moved by the groove (16) and the projection (23), has the function to help user to put his shoes in the drawer unit (20); the groove (16) and the projection (23) fixes and supports the footing (30) and the drawer unit (20) so that can prevent them from being moved or separated easily; the perfuming and disinfecting part (24) of the drawer unit (20) removes bad smells in the drawer unit (20).

What is claimed is:

1. In a car mattress which includes a body having a certain area corresponding to a feet resting area in a car indoor, an accommodating unit provided in an upper portion of the body and having a plurality of partitions for storing the shoes and a cover for opening and closing, and a feet resting unit which is assembled and disassembled for resting feet thereon, a car mattress, comprising:

a wall provided at both sides of the body for supporting the feet resting unit and accommodating unit;

a toothed rail shaped fixture provided in an upper surface of the body for supporting the feet resting unit;

a fixing corresponding unit provided in a lower surface of the feet resting unit and corresponding to the fixture;

a transfer groove formed in an inner side of the wall of the body in order for the accommodating unit to be freely moved to an upper side of the feet resting unit; and a transfer protrusion formed in both side surfaces of the accommodating unit and corresponding to the transfer groove.

2. The mattress of claim 1, further comprising a feet resting fixing means and an accommodating unit fixing means in the body for fixing and supporting the feet resting unit and the accommodating unit, respectively.

3. The mattress of claim 2, wherein said feet unit fixing means includes:
- a plurality of fixing holes formed in one side of the feet resting unit at a regular interval therebetween;
- a through hole formed in an inner side of the body and corresponding to one of the fixing holes; and
- a fixing pin which passes through the through hole and the fixing holes for fixing the feet resting unit.

4. The mattress of claim 2, wherein said accommodating unit fixing means includes a fixing lever for fixing and supporting one side surface of the accommodating unit based on a rotation in a portion in which the accommodating unit is accommodated in one side of the wall.

5. The mattress of claim 1, further comprising:
- an assistant accommodating unit for partitioning the interior of the accommodating unit and arranging the items; and
- an aroma and disinfection generation unit which is activated by a power from a car for eliminating bad smell from shoes stored in the interior.

6. The mattress of claim 1, further comprising a heat coil provided in an upper inner surface of the feet resting unit and operating by receiving a power from a car for thereby generating heat on the feet resting portions.

* * * * *